United States Patent [19]
Tackman

[11] 3,750,173
[45] July 31, 1973

[54] FREQUENCY TRANSLATING REPEATER (BOOMERANG) USING SINGLE-SIDEBAND TECHNIQUES

[75] Inventor: Norbert E. Tackman, Corona, Calif.

[73] Assignee: United States of America as represented by the Secretary of the Navy

[22] Filed: July 29, 1970

[21] Appl. No.: 64,913

[52] U.S. Cl. ............................................. 343/17.7
[51] Int. Cl. ............................................. G01s 7/40
[58] Field of Search .......................... 343/17.7, 8

[56]        References Cited
             UNITED STATES PATENTS
2,935,701   5/1960   Robinson et al. ............... 343/17.7 X
2,874,380   2/1959   Fuller et al. ....................... 343/17.7
3,167,768   1/1965   Rosen .................................. 343/17.7
2,830,290   4/1958   Mercer ............................... 343/17.7

*Primary Examiner*—Benjamin A. Borchelt
*Assistant Examiner*—C. E. Montone
*Attorney*—R. S. Sciascia and J. M. St. Amand

[57]  ABSTRACT

A device for returning or reflecting an incident RF signal translated in frequency by single-sideband techniques; the transmitter and receiver local oscillator frequencies are identical.

7 Claims, 2 Drawing Figures

NORBERT E. TACKMAN
*INVENTOR.*

BY *J. M. St. Amand*

ATTORNEY

FREQUENCY TRANSLATING REPEATER (BOOMERANG) USING SINGLE-SIDEBAND TECHNIQUES

The invention herein described may be manufactured and used by or for the Government of the United States of America for governmental purposes without the payment of any royalties thereon or therefor.

This invention is related to RF propagation. The purpose of this invention is to return or reflect an incident RF signal, translated in frequency, by single-sideband techniques. Similar to a "boomerang-action" a signal sent out by a transmitter is returned via the device of this invention. An object of this invention is to provide a frequency translated beacon for use in calibration and alignment of antenna systems, short-range simulation of multi-facet targets, and any other propagation-reflection work for which an offset frequency signal return would be useful.

The old methods used: completely passive reflectors in which the return signal was the same frequency as the incident frequency; or a parabolic reflector and a solid-state frequency-modulated transmitter which resulted in a reflected signal comprised of the incident frequency and equal amplitude upper-and-lower-sideband frequencies. The first old method offers no clutter rejection of nearby unwanted reflections. The second old method has the disadvantage of receiving signal return nulls from the modulating sidebands if the receiver local-oscillator frequency is equal to the transmitted frequency. In the operation described by the second old method, one of the two sidebands alone can be utilized for single sideband operation only if the receiver local oscillator frequency LO is shifted above the higher sideband frequency or below the lower sideband frequency by an amount equal to the receiver input frequency.

The present invention permits short-range simulation of multi-facet targets, antenna feed optimization, focusing, and boresighting of RF systems; particularly high stability systems with no RF preselection. Relatively inexpensive equipment and parts are utilized and undesirable phenomena associated with similar reflecting devices is eliminated. This device can also be especially useful in propagation studies of RF reflected signals, range and azimuth calibration, and antenna pattern measurements; it has simple adjustment and operation procedure.

In order that the invention may be readily understood, it will be described in detail with reference to the accompanying diagrammatic drawings, in which.

DESCRIPTION OF INVENTION

Figure 1:
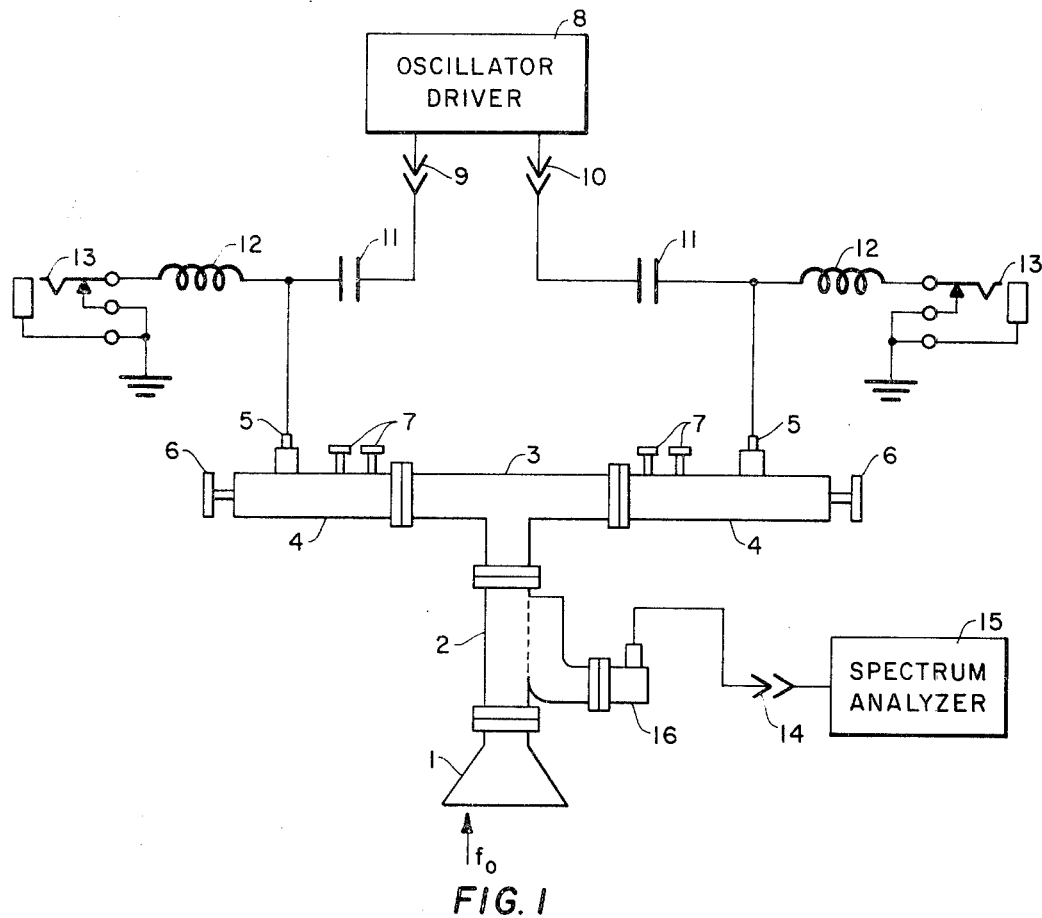
FIG. 1 shows an embodiment of a circuit arrangement for the invention.

FIG. 1 shows an antenna 1 which receives an incident signal from a transmitter 19 and antenna 18 (FIG. 2) at a frequency of $f_o$. The incident signal is coupled through a directional coupler 2 to a signal splitting tee 3. Each arm of the tee 3 is connected to a tunable detector mount or mixer 4 containing a diode (crystal) detector 5, a sliding short 6, and a plurality of tuning screws 7. An oscillator-driver 8 supplies two sinusoidal outputs, 9 and 10, which are in phase quadrature at a frequency $f_R$. Outputs 9 and 10 are each coupled to one diode detector 5 through a capacitor 11, respectively.

These capacitors 11 prevent any D.C. diode current from flowing back into and through the oscillator-driver 8. A D.C. current path for each of the diodes is supplied by means of a respective choke 12 and metering jack 13. By plugging a meter into jack 13, the associated diode current can be obtained. The microwave diodes used in diode detectors 5 are selected for use at the incident operating frequency $f_o$, so as to operate as efficient mixers. The power level at outputs 9 and 10 are chosen so that optimum mixer current will flow in the selected diodes.

The incident frequency, $f_o$, received at the antenna 1 is divided in power at the junction of the tee 3 so that nearly equal amounts of power, depending upon the efficiency of the tee 3, are applied to each mixer diode 5. With the modulating frequency, $f_R$, also applied to the mixer diodes, sideband frequencies are generated at frequencies of $f_o + f_R, f_o - f_R$ and $f_o \pm (n+1)f_R$; where $n$ equals one to infinity. Only the first sideband above and below the carrier frequency, $f_o$, are important to this invention. The carrier frequency, $f_o$, and all sideband frequencies generated by each diode are reflected to the center of the tee 3 because of the shorts 6. Due to the quadrature phasing of the modulating signals, the associated upper or lower sidebands generated by the opposing diodes will have phase relationships such that either the upper sidebands, $f_o + f_R$, or the lower sidebands, $f_o - f_R$, may be made to cancel in power at the center of the tee 3 by adjustments of the shorts 6. The remaining associated upper and lower sidebands will sum to various amounts of power depending upon their phasing. The function of the tuning screws 7 is to adjust the power of the sideband selected for cancellation such that the power from one diode equals the power from the opposing diode at the center of the tee 3, thus correcting any imbalance in mixer and tee efficiency.

The function of each sliding short 6 is to adjust the reflecting point in each tunable detector mount 4 such that the sideband to be cancelled, when reflected from one tunable detector mount 4 to the center of the tee 3, has a phase which is opposite to the phase of the same sideband arriving at the center of the tee 3 from the opposing tunable detector mount 4.

Figure 2:
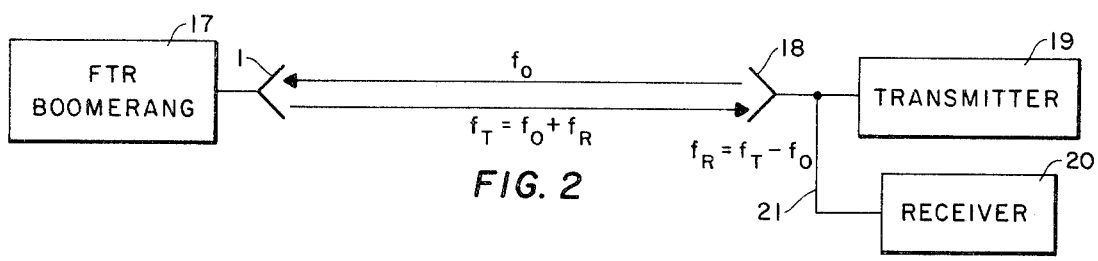
FIG. 2 shows an embodiment of a system arrangement using the invention.

The resultant summed signals of $f_o$ and the sidebands then pass from the tee 3 through the directional coupler 2 to the antenna horn 1 and are radiated back through space to the transmitter/receiver horn 18, as shown in FIG. 2. For the system shown in FIG. 2, the transmitter 19 signal, $f_o$, acts as the local oscillator (LO) signal for the received signal $f_o + f_R$ or $f_o - f_R$; depending upon which sideband is transmitted by the Frequency Translating Repeater (FTR) 17. The signal resulting from mixing the LO with the return signal will be at the modulating frequency $f_R$, which is fed to receiver 20.

To adjust the Frequency Translating Repeater 17 for cancellation of one sideband, the signal input 14, FIG. 1, of a spectrum analyzer 15 is coupled to an adapter 16 which is connected to the directional coupler 2. The directional coupler 2 allows sampling, by spectrum analyzer 15, of the repeater 17 output signals with little loss of power while attenuating the signals received by the repeater 17. From observing the repeater 17 output signals on the spectrum analyzer 15, the adjustable shorts 6 and tuning screws 7 can be adjusted until the unwanted sideband frequency is minimized leaving the desired sideband and $f_o$.

The advantages of this invention are: clutter rejection of nearby signal reflections which is not offered by passive reflectors; no signal return nulls occur as a function of receiver-reflector range (these nulls do occur in double-sideband reflector systems when the receiver local oscillator and the transmitter are the same frequency); the transmitter and local oscillator frequencies LO are identical for single-sideband reflector operation; and, a highly useful means of a short-range simulation of a target having multiple reflecting points.

The generation of a single-sideband repeater signal for systems in which it is desired to use the same frequency for both the transmitter and the receiver local oscillator are not available with prior devices.

The construction of this invention may utilize waveguide, coax, stripline, or integrated circuitry; or a combination thereof. Antenna 1, FIG. 1, can be of any type (horn, spiral, flat plate, etc.) having the desired frequency response and characteristics. Also, any oscillator driver 8 having the desired outputs may be used.

For fixed frequency operation, the adjustable shorts 6 and tuning screws 7 may be eliminated by providing the proper path lengths and power balance between the diode detectors 5 to give the desired sideband summation at the tee 3 junction. Also, directional coupler 2 can be eliminated, if desired, once the system is tuned.

What is claimed is:

1. A frequency translating repeater for returning an incident RF signal translated in frequency comprising:
   a. an antenna means having desired frequency response and operable to receive an incident signal,
   b. a signal splitting means having an input and first and second outputs for equally dividing the power from an incident signal,
   c. said antenna coupled to the input of said signal splitting means,
   d. tunable first and second detector means,
   e. the first and second outputs of said signal splitting means being fed to the inputs to said first and second detector means respectively,
   f. means for providing first and second sinusoidal modulating frequencies which are in phase quadrature,
   g. said first modulating frequency being coupled to said first detector means through a first capacitor means, and said second modulating frequency being coupled to said second detector means through a second capacitor means,
   h. an incident frequency signal received at said antenna means being equally divided and applied to said first and second detector means, respectively, where said first and second modulating frequencies, respectively, are also applied thereto thus generating sideband frequencies, said incident frequency plus all sideband frequencies generated by said first and second detector means being reflected to said signal splitting means, said tunable first and second detector means due to the quadrature phasing of said modulating frequencies being operable to adjust the reflecting points therein such that a selected sideband to be cancelled when reflected therefrom will be of opposite phase when arriving at said signal splitting means, remaining associated upper and lower sideband frequencies being summed and then passing through said directional coupler means to said antenna where they are radiated back to the source of said incident signal.

2. A device as in claim 1 wherein said means for providing first and second sinusoidal modulating frequencies which are in phase quadrature is an oscillator driver.

3. A device as in claim 1 wherein said signal splitting means is a signal splitting tee.

4. A device as in claim 1 wherein said first and second detector means are microwave diode detectors in a tunable mixer mount.

5. A device as in claim 4 wherein each of said diode detectors is provided with a D.C. current path via first and second choke coils, respectively, which are connected to respective junctions of said capacitor means with said detectors, said choke coils isolating the modulating frequencies from ground.

6. A device as in Claim 1 wherein a directional coupling means couples said antenna to said signal splitting means.

7. A device as in claim 6 wherein a spectrum analyzer is coupled to said directional coupling means to sample and observe the output of the frequency translating repeater permitting adjustment of said detector means in order to tune out unwanted sideband frequencies.

* * * * *